UNITED STATES PATENT OFFICE.

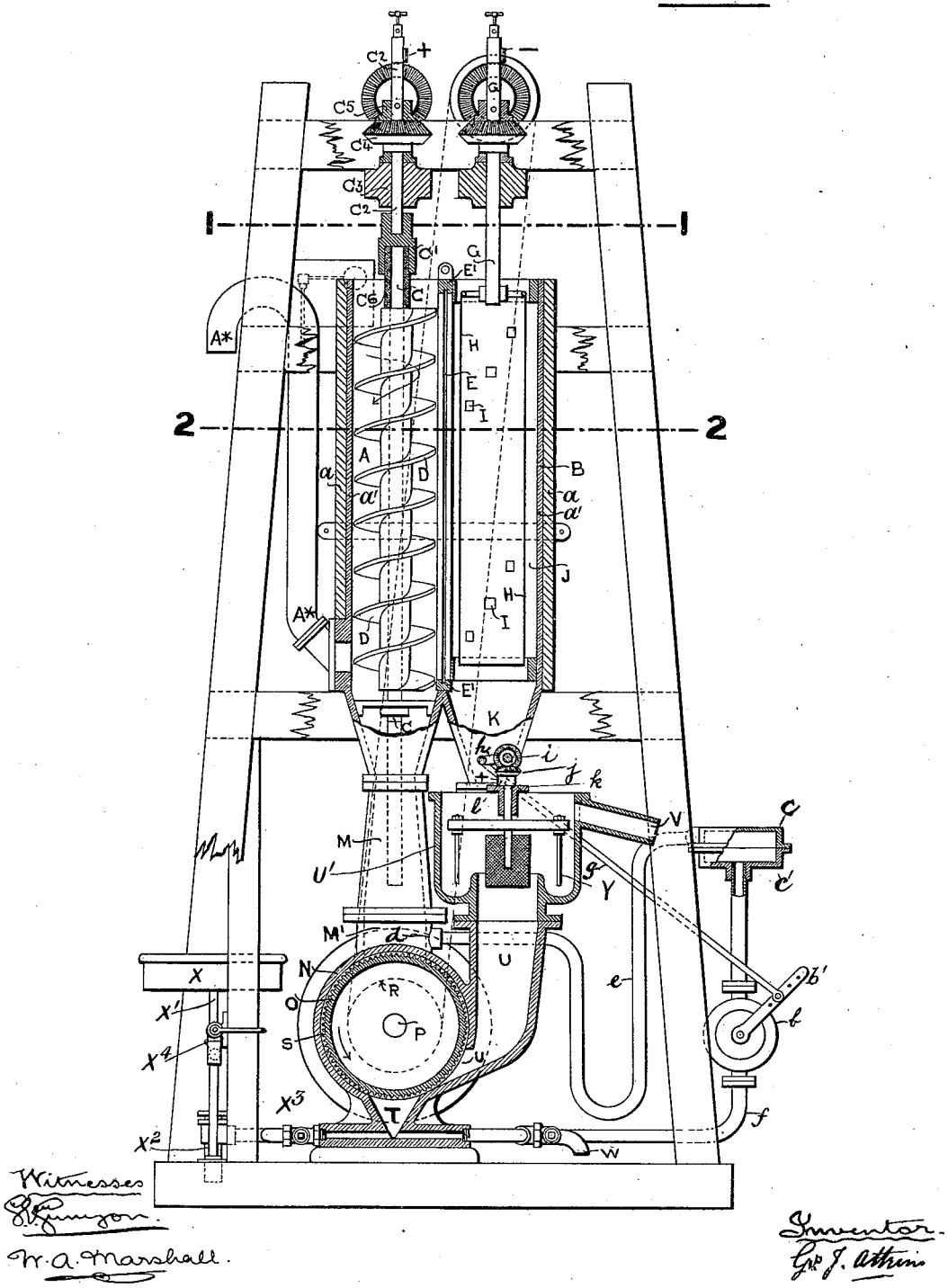

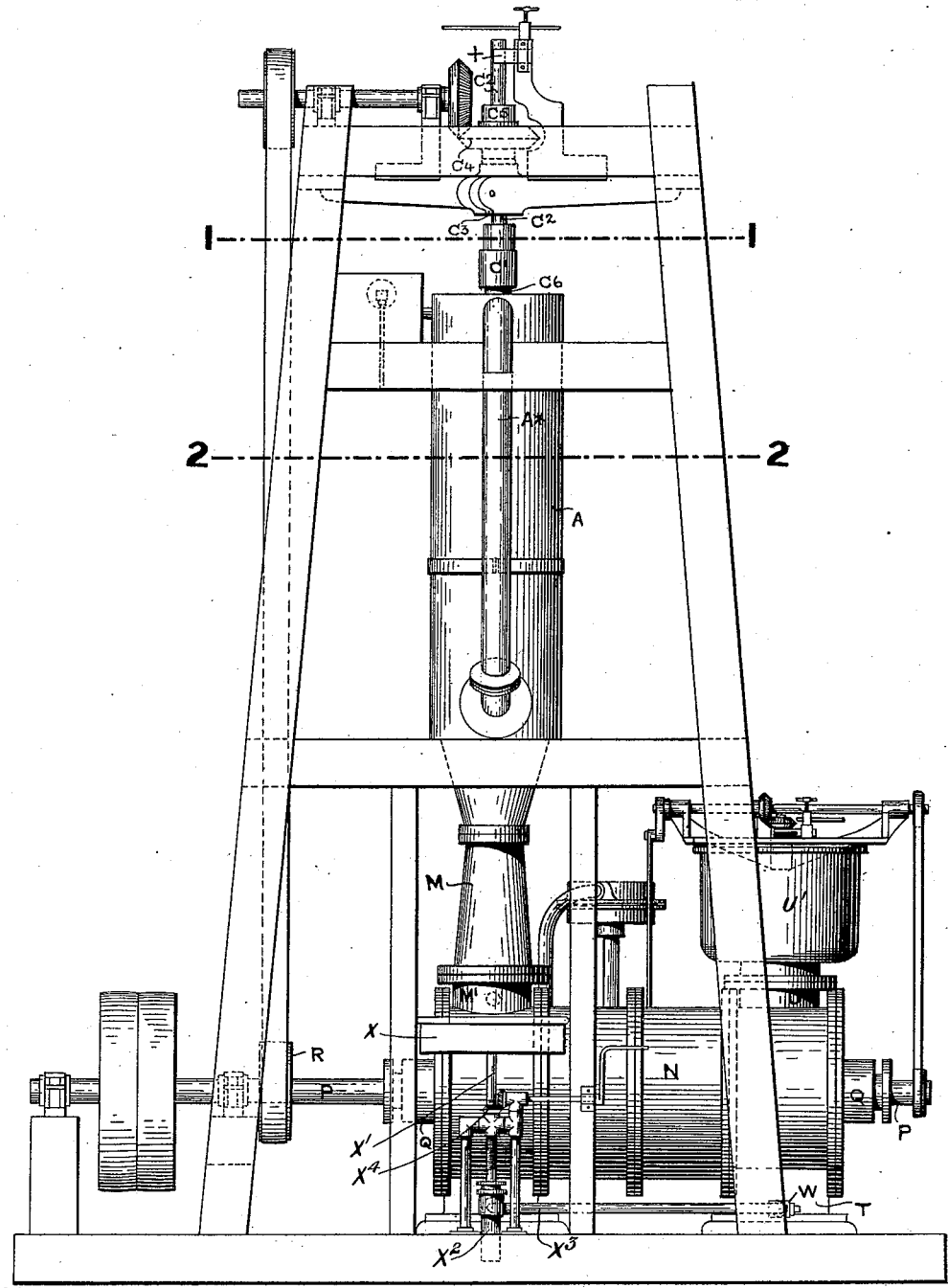

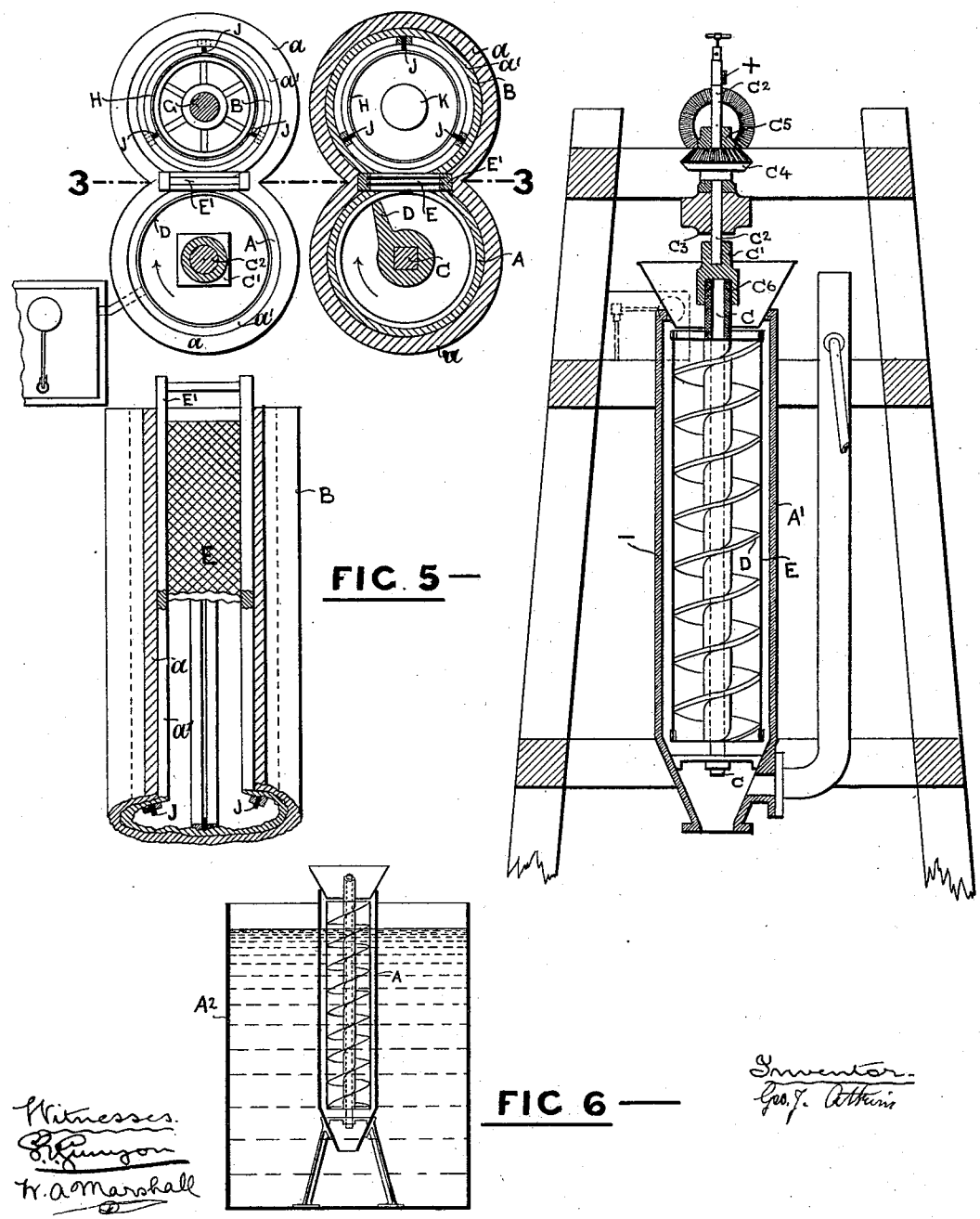

GEORGE J. ATKINS, OF LONDON, ENGLAND.

ELECTROLYTIC APPARATUS FOR SEPARATING GOLD AND OTHER METALS FROM THEIR ORES.

SPECIFICATION forming part of Letters Patent No. 473,105, dated April 19, 1892.

Application filed April 28, 1891. Serial No. 390,866. (No model.) Patented in England September 28, 1886, No. 12,295; in France November 24, 1887, No. 187,179; in Germany November 27, 1887, No. 45,774; in India, of 1887, No. 235; in Cape of Good Hope December 9, 1887, No. 425; in Natal December 19, 1887; in Canada December 20, 1887, No. 28,212; in Victoria December 21, 1887, No. 5,523; in New South Wales December 22, 1887, No. 403; in South Australia December 24, 1887, No. 931; in Tasmania December 29, 1887, No. 520/10; in Queensland December 29, 1887, No. 373; in New Zealand January 4, 1888, No. 2,722; in Spain April 27, 1888, No. 12,412/7,697; in Austria-Hungary May 13, 1888, No. 49,944 and No. 11,502, and in Transvaal November 22, 1889, No. 140.

*To all whom it may concern:*

Be it known that I, GEORGE JONES ATKINS, electrician, a subject of the Queen of Great Britain, residing at Tottenham, London, in the county of Middlesex and Kingdom of Great Britain, have invented a new or Improved Electrolytic Apparatus for Separating Gold and other Metals from Their Ores, (for which I have received Letters Patent in England, No. 12,295, dated September 28, 1886; in France, No. 187,179, dated November 24, 1887; in Germany, No. 45,774, dated November 27, 1887; in Austria-Hungary, No. 49,944 and No. 11,502, dated May 13, 1888; in Spain, No. 12,412/7,697, dated April 27, 1888; in Canada, No. 28,212, dated December 20, 1887; in India, No. 235 of 1887; in Cape of Good Hope, No. 425, dated December 9, 1887; in Natal, dated December 19, 1887; in Queensland, No. 373, dated December 29, 1887; in Tasmania, No. 520/10, dated December 29, 1887; in New Zealand, No. 2,722, dated January 4, 1888; in Victoria, No. 5,523, dated December 21, 1887; in New South Wales, No. 403, dated December 22, 1887; in South Australia, No. 931, dated December 24, 1887, and in Transvaal, No. 140, dated November 22, 1889,) of which the following is a specification.

This invention has for its object the separation of gold, silver, and other metals from their ores; and it consists of apparatus for subjecting crushed or pulverized ore to electrolytic action in the anode-compartment of an electrolytic apparatus, such anode-compartment being provided with devices by which the said ore is retarded in its descent through the said anode-compartment, so as to keep the particles of ore in motion and in contact with the pole in the electrolytic solution for a sufficient period of time to allow the electro-chemical action—such as oxidation, chlorinization, or treatment with cyanogen, for example—to take place.

In the drawings hereto annexed, Figure 1 is a vertical sectional elevation, and Fig. 2 a side elevation, of apparatus constructed in accordance with my invention. Fig. 3 is a partial plan taken at line 1 1 of Figs. 1 and 2. Fig. 4 is a partial section taken at line 2 2 of the same figures, and Fig. 5 is a partial vertical sectional elevation taken at line 3 3 of Figs. 3 and 4. Figs. 3, 4, and 5 are to an enlarged scale. Fig. 1* is a vertical sectional elevation of a modified form of the apparatus, and Fig. 6 is a diagram showing the apparatus used in a tank containing solution instead of in connection with an amalgamating apparatus.

Similar letters of reference relate to like parts in all the figures of the drawings.

A B is a vertical chamber divided into two cylindrical parts forming, respectively, the anode and cathode compartments of the electrolytic apparatus, into the anode-compartment of which the crushed or pulverized ore to be treated is fed in a wet or dry condition from a hopper or other suitable feeding device. (Not shown in the drawings.) The chamber A B may be composed of an external case $a$, formed of timber, iron, earthenware, or other suitable material, and of an internal case $a'$, formed of gutta-percha, ebonite, earthenware, or any other suitable substance not acted on by the electrolyte employed. Revolving vertically in the anode-compartment A is a shaft C, carrying a broad-bladed screw D, composed of carbon, lead, or other suitable material which is a conductor of electricity, but is not soluble in the electrolytic solution employed. The edge of this screw approaches as near to the sides of the compartment A as possible, but preferably without touching them. The shaft C may be composed of wood or other suitable non-conductor of electricity and may conveniently be made square, the hole in the screw D being made square to correspond; or, if preferred, the said shaft C may consist of a metal core thoroughly protected from the action of the electrolyte in any suitable way. The upper end of the shaft C is secured in a metallic socket C', formed on or connected with a metallic shaft $C^2$, which revolves in a bearing $C^3$.

$C^4$ is a bevel-pinion free to rotate loosely on the shaft $C^2$.

$C^5$ is a collar secured to the shaft $C^2$, and resting on the upper surface of the bevel-pinion C⁴ transmits thereto the weight of the shaft C and its screw D, so that as the pinion C⁴ rotates it turns the said shaft C and screw D by the frictional contact between the pinion C⁴ and the collar C⁵. When the resistance of the screw D to motion is in excess of what this friction will overcome, the pinion C⁴ continues to revolve without imparting motion to the shaft C and screw D. This arrangement therefore acts as a safety frictional driving-gear to prevent injury to the screw D or its shaft C. Electrical connection is made between the screw D and socket C', and consequently the shaft C², by the carbon or other suitable conducting-sleeve C⁶.

The cathode-compartment B is provided with a vertical metallic revolving shaft G, preferably furnished with frictional driving-gear similar to that above described in reference to the shaft of the anode-compartment. The shaft G carries a cathode-cylinder H, of copper or other suitable conductive material, preferably provided with openings I to secure uniformity of the strength of the electrolytic solution inside and outside the said cylinder H.

J are india-rubber or other flexible scrapers secured in the cathode-compartment B for the purpose of removing the spongy or pulverulent deposit from the revolving cathode-cylinder H as it is formed thereon. This spongy or pulverulent deposit is collected at the bottom of the cathode-compartment and is periodically removed therefrom through the opening K.

Between the anode and cathode compartments A and B is provided a porous partition or filter E, of woven matting, flannel, felt, porous plate, or other suitable well-known material or combination of materials, which, while preventing the passage of the gangue into the cathode-compartment, still allows a free circulation of the electrolyte between the anode and cathode compartments. This partition or filter E is preferably mounted in a frame E', adapted to slide vertically in grooves, so that it can be readily taken out or replaced for convenience of cleaning or repairing, or in some cases a frame containing louver-boards or weather-boards may be employed. As the screw D revolves in the anode-compartment A in the direction of the arrow, it causes the crushed or pulverized ore to be retarded in its descent in opposition to the action of gravity, (which latter tends to cause it to descend along the upper inclined surface of the screw,) so as to delay the descent of the particles of ore in the electrolytic solution and to keep them in contact with the anode-screw for a sufficient length of time to allow the process of oxidation, chlorination, or other action on the ore (according to the character of the solution employed) to be effected by the anions liberated at the anode.

Instead of rotating the screw D in the direction indicated by the arrow in Fig. 1, it may be rotated in the opposite direction in cases where the electrolytic action on the ore is sufficiently rapid to admit of it. In some cases the screw D may remain stationary and the ore be caused to flow or roll down on the upper surface of its thread by the action of the solution introduced at the top of the anode-compartment, such solution passing through the anode-compartment and flowing off therefrom by the pipe A*, to be again returned to the top of the anode-compartment by a pump or otherwise, the gangue and any metal remaining therein passing away from the anode-compartment through the passage M, as hereinafter more fully described.

In some cases I substitute for the screw D in the anode-compartment a series of inclined ledges or shelves, so arranged that the ore in passing from the top to the bottom of the anode-compartment is caused to fall from one to the other of such ledges or shelves, which are composed of material similar to that employed for the said screw D, and, like it, act as the insoluble part of the positive or anode pole of the electrolytic apparatus.

Instead of two compartments A B, as shown, in Fig. 1, one compartment only may be employed, as shown in Fig. 1*, in which case the said compartment may consist of a metal cylinder A'—of copper, for example—which forms the negative or cathode pole, the screw D or other retarding apparatus forming the opposite or anode pole, which is incased in or surrounded by a porous partition or filter E, of canvas, flannel, felt, or other suitable filtering material, for preventing the gangue from reaching the cathode-pole and from falling over the edge of the screw. The ore, after being treated in this electrolytic apparatus, may be passed directly to an amalgamating apparatus similar to that shown in Figs. 1 and 2, placed at the lower end of the compartment A', the cylinder of such amalgamating apparatus being preferably connected to the compartment A', so as to form therewith a continuous cathode-pole. After having been freed more or less in the anode-compartment A from those metals which have been dissolved in the electrolytic solution, the pulverized ore still containing the coarser particles of gold, and in some cases silver as well, passes to the lower part of the anode-compartment, which lower part is preferably tapered and opens into the pipe or passage M, which is either in communication with the inlet-passage M' of an amalgamating apparatus N, or is provided with a tap or other means of drawing off the lower part of the contents of the compartments A or A' when required. The said pulverized ore may be forced downward through the passage M' by a propelling-screw or other suitable device driven by the lower end of the shaft C of the retarding-screw D or otherwise.

I generally employ in connection with the above-described electrolytic apparatus, and preferably connected directly therewith, as shown in the drawings, an amalgamating apparatus which forms the subject of another application for a United States Patent filed at same time as this present Serial No. 390,864. This amalgamating apparatus consists of a horizontal cylinder N—of cast-iron or slate, for example—with closed ends and containing a revolving drum O, carried by the shaft P, revolving in stuffing-boxes Q in the covers of the cylinder N, and driven by a pulley R or otherwise. The periphery and sides or ends of the drum O fit more or less closely the interior of the said cylinder N. Grooves or channels S are formed across the periphery of this drum O, preferably in a more or less oblique direction, and the spaces thus formed, as well as the clearance-spaces between the drum and the cylinder, are filled with mercury, a well or sump T for a reserve of mercury being also preferably provided at the bottom of the cylinder N. The crushed or pulverized ore that has passed through the anode-compartment A of the electrolytic apparatus is introduced into the amalgamator through the passage M' at one end of the cylinder N, enters the grooves or channels S in the periphery of the drum O, and is carried down by the revolution of the said drum in the direction of the arrow to the lower part of the cylinder N, through the mercury therein, and rises at the other side as the drum continues its revolution, the oblique direction of the grooves or channels assisting it to gradually make its way to the opposite end of the drum after being carried round and round therein several times through the mercury, and it finally escapes from the grooves or channels in the periphery of the drum by rising, on account of its inferior density, through the mercury at an outlet-passage U at the opposite end of the cylinder N and passes away by the spout V. It will be understood that in passing through the amalgamator the particles of ore are in a constant state of agitation and are brought into intimate or rubbing contact with the mercury, and that consequently any gold or silver contained in or mixed with the ore is retained by the said mercury, which is periodically or continuously drawn off through the tap W and the gold and silver separated from it in the usual way.

X is a reservoir, at the bottom of which is a pipe X', opening into a chamber X², connected by a pipe X³ with the mercury in the cylinder N. The lower end of the pipe X' passes through a stuffing-box at the top of the chamber X², so that the said pipe X', with the reservoir X, may be raised and lowered within certain limits by means of the bevel-gearing X⁴, operated by a crank-handle. The bevel-wheel X⁴ is screwed internally, and the pipe X' is screwed through it, so that as the crank-handle is turned in one direction or the other the bevel-wheel X⁴ is rotated likewise in its bearing and acts as a nut upon the screwed part of the pipe X', raising or lowering the same with the reservoir X.

When it is desired to increase the quantity of mercury in the amalgamating apparatus, so as to produce a greater head of mercury, and thereby to retard the flow of ore from the electrolytic apparatus or other source of supply, the reservoir X and pipe X' are raised and more or less of the mercury flows from the reservoir X into the cylinder N, and when it is desired to reduce the quantity of mercury in the amalgamating apparatus, so as to produce a lesser head of mercury, and thereby to increase the flow of ore from the electrolytic apparatus or other source of supply, the reservoir X and the pipe X' are lowered and more or less of the mercury flows from the cylinder N into the reservoir X.

Sometimes the mass of gangue issuing at the outlet-passage U from the amalgamating apparatus is in the form of a stiff paste, and thereby does not pass away freely or carries with it some of the mercury. In order to facilitate its passage out of the apparatus and to prevent it from carrying mercury with it, a rotary stirrer Y may be employed, revolving in the hopper U' at the upper end of the outlet-passage U and driven by a belt from the shaft P or by other suitable means.

It will be understood that mercury may be introduced into and withdrawn from the amalgamator continuously, if necessary. For example, it may be taken by a pipe $f$ from the bottom of the sump T and pumped by the pump $b$, which may be of any suitable kind, through a straining-box $c$, furnished with wash-leather or other suitable strainer $c'$, and then allowed to flow back into the upper part of the inlet $d$ of the amalgamator through a pipe $e$.

A by-pass may be provided to allow of the removal of the strainer containing the amalgam without interfering with the circulation of the mercury. If a rotary pump (such as is shown in the drawings) be employed, the piston is provided with a radial operating-arm $b'$, which is connected by a rod $g$ with an arm $h$ of a small shaft having thereon a bevel-pinion $i$, which meshes with a similar pinion $j$ on the shaft of the stirrer Y. The shaft on which bevel-pinion $i$ is mounted rotates, and thereby operates the pump through the connections stated. The stirrer-shaft is mounted in a bearing $k$ and provided at its lower end with an anode-pole consisting of a piece of carbon which is hatched or doubly crossed.

The positive pole of a dynamo or other suitable generator of electricity is connected by the brush $+$ with the shaft C² and retarding-screw D in the anode-compartment A and the negative pole of the said generator by the brush $-$ with the shaft G and cylinder H in the cathode-compartment B. The usual means are of course employed to effect the proper insulation of the parts of the electrolytic apparatus which require to be so treated.

It will now be understood that the electrolytic compartments A B, Figs. 1, 2, 3, 4, and 5, or the compartment A' of Fig. 1*, as the case may be, having been filled with one of the usual well-known electrolytic solutions—such as a solution of sodium chloride, sodium sulphate, potassium cyanide, or ferro-cyanide of potassium—according to the nature of the ore to be acted on and the result to be obtained, the ore to be treated, after having been crushed or pulverized in the usual way, is introduced gradually and continuously through a hopper or other feeding device into the top of the anode-compartment A or A'. The ore falls onto the retarding-screw D, and gravity causes it to roll down the inclined surface of the screw-thread; but as the latter is rotated, preferably in the direction which tends to raise the said ore toward the top of the anode-compartment, the passage of the ore from the top thereof to the bottom through the electrolytic solution is retarded and the whole of the ore is kept for a considerable time in contact with the anode-pole, so as to form a more or less soluble portion thereof, while every particle is exposed to the action of the anions there generated. The effect of this is that by the time the ore has reached the bottom of the anode-compartment all or part of the baser metals have been dissolved and the gold left in or mixed with the gangue is in a free condition ready to be removed therefrom by the amalgamation process. The cathions resulting from the solution of the metals in the anode-compartment A or A' pass through the partition or filter E into the cathode-compartment and are there deposited upon the cathode-cylinder H in Fig. 1 or upon the copper cylinder A', Fig. 1*, as a pulverulent metallic deposit, which is scraped off the cylinder H by the scrapers J, as above described, and ultimately falls to the bottom of the cathode-compartment, whence it is removed from time to time or continuously for subsequent treatment or disposal, according to its nature and other circumstances. The ore, with the gold or silver, or both, having reached the bottom of the anode-compartment, passes down to the amalgamating apparatus N, which forms the subject of another application for patent filed in the United States Patent Office at same time as this present, or is otherwise dealt with, as may be desired. In the case of the apparatus shown in Fig. 1*, when gold or silver, or both, is or are dissolved and deposited in a pulverulent form on the surface of the cathode A', such deposit falls off and passes, along with the ore, from the anode-compartment to the amalgamating apparatus.

It will be seen from the above description that the process is practically a continuous one—that is to say, a stream of crushed ore is supplied continuously to the anode-compartment, the baser metals are removed from the surface of the gold as it passes through the anode-compartment, and the remaining ore and gold and silver is either removed from the lower end of the anode-compartment to be subsequently treated, or is passed on direct to the amalgamating apparatus, where the gold and silver are separated from the gangue, and the latter issues continuously as waste to be disposed of according to circumstances.

When the electrolytic apparatus is employed separate from any amalgamating apparatus, it may be arranged to stand in a tank $A^2$, (see Fig. 6,) containing a suitable solution, the level of which is the same as that in the electrolytic compartments A and B or A', so that the solution in the tank balances that in the said compartments as the mercury in the amalgamating apparatus balances it in the arrangement above described, and illustrated in the drawings, and serves, like the mercury in that case, as a trap or liquid-valve through which the ore can be discharged from the bottom of the compartment A without the solution in such compartment escaping at the same time. Any suitable mechanism—such as a "Jacob's ladder," for instance—may be employed for removing the ore from the tank as it is discharged thereinto from the compartment A or A'.

When the electrolyte employed is one that liberates chlorine or is otherwise a solvent of gold and the ore under treatment contains gold and a baser metal, the gold is dissolved along with the baser metal; but in most cases the gold so dissolved is immediately chemically precipitated in the metallic state by the baser metal in solution—such as iron, for example—and passes on in that state with the gangue from the anode-compartment to the amalgamating apparatus or elsewhere, as the case may be.

In cases where the gold or silver is dissolved in the anode-compartment, a part of such gold or silver will in some cases be collected in the cathode-compartment, and may afterward be passed through the amalgamating apparatus shown, or through any other suitable amalgamating apparatus, or be subjected to any other method or process of collection.

As the ore is withdrawn from the electrolytic apparatus it necessarily carries with it a certain quantity of the solution, and it is therefore necessary to supply to the compartments A B or A', either continuously or from time to time, sufficient fresh solution to maintain the proper quantity in the apparatus. In some cases—as, for example, when treating ore containing a considerable quantity of silver—the ore which has been acted on in the anode-compartment A may be withdrawn from the bottom thereof and be introduced into the top of the cathode-compartment B, which may be provided with a screw or other retarding device similar to that in the anode-compartment, instead of the cylinder H. In this case the amalgamating apparatus is placed at the bottom of the cathode-compartment instead of at the bottom of the anode-compartment, and proper means must be provided for conveying the ore acted on in the anode-compartment from the lower end of the latter to the upper end of the cathode-compartment. This arrangement is applicable, for example, when treating ore containing sulphide of silver with a solution of chloride of sodium in the anode-compartment. The sulphide of silver is chlorinized in the anode-compartment, forming chloride of silver and liberating the sodium which appears at the cathode. Then by taking the gangue containing the chloride of silver from the lower end of the anode-compartment and passing it through the cathode-compartment the sodium at the cathode-pole combines with the chlorine of the chloride of silver, liberating the silver in the metallic state, which is separated from the gangue by passing it through the above-mentioned or any other suitable amalgamating apparatus.

By the employment of my invention ores may be treated in large quantities in an expeditious, continuous, effective, and economical manner, comparatively small quantities of solution being employed, and the ores being allowed to pass through the apparatus principally by the action of gravity, the power required for working the apparatus is reduced to a minimum.

Having now particularly described and ascertained the nature of my said invention and in what manner the same is to be performed, I declare that I make no claim generally to the use of electrolytic apparatus for the purpose of separating gold and other metals from their ores; but What I do claim is—

1. Electrolytic apparatus for separating gold and other metals from their ores, which consists of an upright anode-compartment through which the ore is passed continuously, having within it an anode constructed to receive and retard the descent of the ore, while the ore itself forms a more or less soluble portion of such anode-pole, and an upright cathode compartment and pole, the said anode and cathode compartments communicating through an opening closed by a porous diaphragm and having outlets at their lower ends for the removal of the ore which has been acted upon in the anode-compartment and of the metals and other substances that have been deposited or precipitated in the cathode-compartment, all combined, arranged, and operating substantially as hereinbefore described, and illustrated in the drawings.

2. Electrolytic apparatus for separating gold and other metals from their ores, consisting of an upright anode-compartment A, through which the ore is passed continuously, having within it an insoluble ore-supporting device which forms part of an anode-pole, while the ore itself forms a more or less soluble portion of such anode-pole, and an upright cathode-compartment B, having a revolving cathode-pole H and scrapers J, the said anode and cathode compartments communicating through an opening closed by a porous diaphragm and having outlets at their lower ends, all substantially as and for the purpose set forth.

In testimony that I claim the foregoing as my invention I have signed my name in presence of two subscribing witnesses.

GEORGE J. ATKINS.

Witnesses:
STEPHEN EDWARD GUNYON,
115 *Cannon Street, London, E. C.*
WILLIAM ANDREW MARSHALL,
50 *Londesborough Road, Stoke Newington, N.*